US009739317B2

(12) United States Patent
Lu

(10) Patent No.: US 9,739,317 B2
(45) Date of Patent: Aug. 22, 2017

(54) CLUTCH PLATE WITH CUSHION SEGMENTS WITH DUAL ENGAGEMENT CHARACTERISTICS

(71) Applicant: SCHAEFFLER TECHNOLOGIES AG & CO. KG, Herzogenurach (DE)

(72) Inventor: Phong Lu, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 70 days.

(21) Appl. No.: 14/743,529

(22) Filed: Jun. 18, 2015

(65) Prior Publication Data
US 2016/0369851 A1 Dec. 22, 2016

(51) Int. Cl.
F16D 13/68 (2006.01)
F16D 13/64 (2006.01)

(52) U.S. Cl.
CPC .............. F16D 13/68 (2013.01); F16D 13/64 (2013.01); F16D 2013/642 (2013.01)

(58) Field of Classification Search
CPC ........... F16D 13/68; F16D 13/71; F16D 13/64
See application file for complete search history.

(56) References Cited

U.S. PATENT DOCUMENTS

| 2,296,515 A | 9/1942 | Goodwin | |
|---|---|---|---|
| 2,333,308 A | 11/1943 | Goodwin | |
| 2,534,991 A * | 12/1950 | Reed | F16D 13/64 192/107 C |
| 2,630,199 A * | 3/1953 | Gamble | F16D 13/64 192/107 C |
| 3,261,439 A | 7/1966 | Binder | |
| 3,921,777 A | 11/1975 | Rist | |
| 4,113,078 A | 9/1978 | Maycock | |
| 4,422,539 A | 12/1983 | Werner | |
| 4,697,683 A * | 10/1987 | Graton | F16D 13/64 192/107 C |
| 4,993,531 A | 2/1991 | Villata | |
| 5,085,307 A | 2/1992 | Scheer | |
| 5,413,202 A * | 5/1995 | Maucher | B60K 17/02 192/107 C |
| 5,553,695 A | 9/1996 | Lutz et al. | |
| 5,794,754 A | 8/1998 | Villata | |
| 5,937,989 A * | 8/1999 | Yoneda | F16D 13/64 192/107 C |
| 6,659,254 B2 | 12/2003 | Kraus et al. | |

* cited by examiner

Primary Examiner — Jacob S Scott
Assistant Examiner — Tinh Dang
(74) Attorney, Agent, or Firm — Simpson & Simpson, PLLC

(57) ABSTRACT

A clutch plate, including: an axis of rotation; a first annular plate with a first side facing in an axial direction; a second annular plate: axially separated from the first annular plate by a gap; and including a second side facing the first side in an opposite axial direction; a first cushion segment connected to the first and second annular plates and including: a radially outermost edge; a slot extending into the cushion segment in a circumferential direction; a first edge connecting the slot and the radially outermost edge; and a second edge extending radially inward from the slot. The first edge contacts the second side and the second edge is separated from the second side by a distance in the axial direction; or, the second edge contacts the first side and the first edge is separated from the first side by a distance in the axial direction.

20 Claims, 14 Drawing Sheets

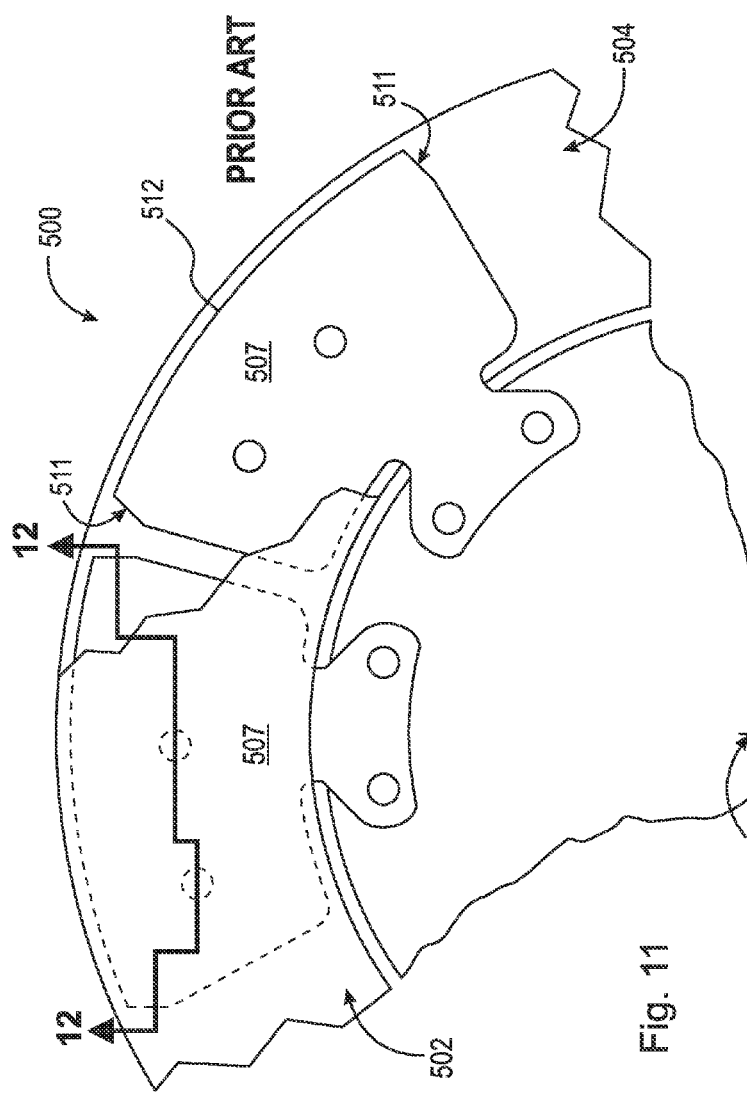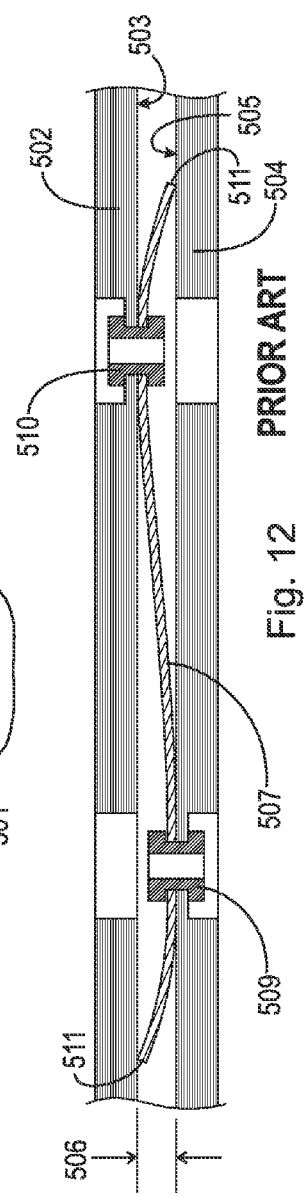

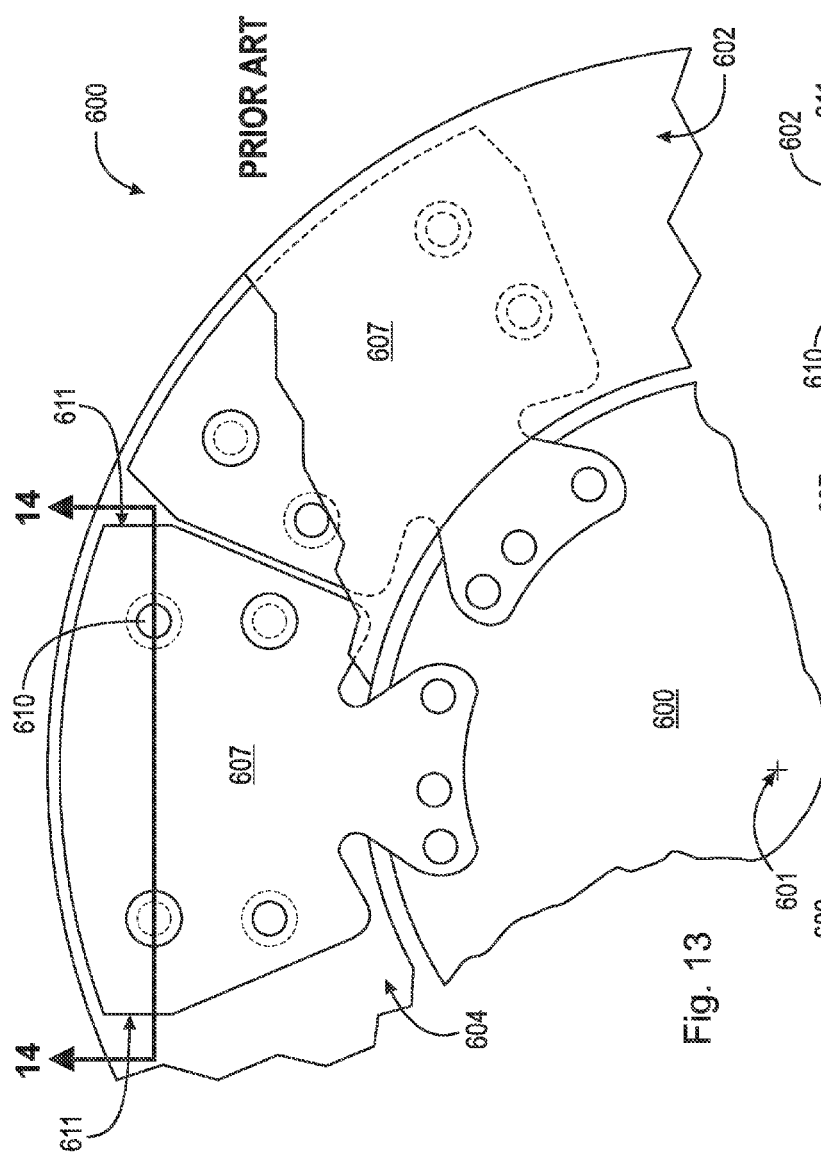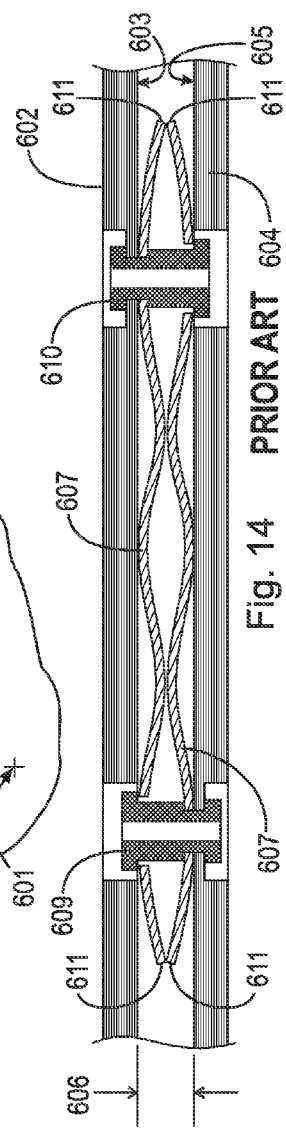

US 9,739,317 B2

CLUTCH PLATE WITH CUSHION SEGMENTS WITH DUAL ENGAGEMENT CHARACTERISTICS

TECHNICAL FIELD

The present disclosure relates generally to a clutch plate with cushion segments, in particular, a clutch plate with cushion segments having unequal gap distances to respective opposing backing plates in order to effect progressive load-deflection characteristics during operation of the clutch plate.

BACKGROUND

To launch a vehicle equipped with a manual transmission, a driver must modulate the engagement of the clutch. The design of the clutch, specifically, the design of the clutch plate, affects the ease of this modulation for the driver. If the clutch plate is designed to apply the load too quickly, it becomes more difficult for the vehicle driver to modulate the clutch and smoothly launch the vehicle.

The parameters that determine the quality of the clutch engagement vary from vehicle to vehicle due to differences in vehicle system combinations. During the development of a new vehicle, poor quality clutch performance and clutch engagement resulting from these differences may not be discovered until very late in the development process. Although it is possible to mitigate these problems by redesigning components of the clutch system, this approach incurs substantial costs, in both time and material, as new components must be designed and tested, and existing components cannot be used. As such, this approach should be avoided when possible.

FIG. 11 is a front view of a portion of prior art clutch plate 500 with conventional cushion segments.

FIG. 12 is a cross-sectional view generally along section line 12-12. The following should be viewed in light of FIGS. 11 and 12. Clutch plate 500 includes: axis of rotation 501; facing annular backing plate 502 with side 503; facing annular backing plate 504, with side 505, which is separated from facing annular backing plate 502 by gap 506; and cushion segments 507. Cushion segments 507 are fixedly connected to facing annular backing plates 502 and 504 using fasteners 509 and 510. Cushion segments 507 include smooth radial sides 511 in contact with one of sides 503 or 505.

FIG. 13 is a front view of a portion of prior art clutch plate 600 with conventional double cushion segments with wave supports.

FIG. 14 is a cross-sectional view generally along section line 14-14. The following should be viewed in light of FIGS. 13 and 14. Clutch plate 600 includes: axis of rotation 601; facing annular backing plate 602 with side 603; facing annular backing plate 604, with side 605, which is separated from facing annular backing plate 602 by gap 606; and cushion segments 607. Cushion segments 607 are fixedly connected to facing annular backing plates 602 and 604 using fasteners 610 and 609, respectively. Cushion segments 607 include smooth radial sides 611. For respective pairs of axially aligned segments 607, respective edges 611 are in contact.

FIG. 15 is a front view of a portion of prior art clutch plate 700 with conventional double cushion segments used with cera-metallic pads as friction material.

FIG. 16 is a cross-sectional view generally along section line 16-16. The following should be viewed in light of FIGS. 15 and 16. Clutch plate 700 includes: axis of rotation 701; cera-metallic pad annular backing plate 702 with side 703; cera-metallic pad annular backing plate 704, with side 705, which is separated from cera-metallic pad annular backing plate 702 by gap 706; and cushion segments 707. Cushion segments 707 are fixedly connected to cera-metallic pad annular backing plates 702 and 704 using fasteners 710 and 709, respectively. Cushion segments 707 include radially outermost edge 711 with a single slot 712. For respective pairs of axially aligned segments 707, respective edges 711 are in contact.

SUMMARY

The present disclosure broadly comprises a clutch plate, including: an axis of rotation; a first annular backing plate with a first side facing in a first axial direction; a second annular backing plate: separated from the first annular backing plate by a gap in the first axial direction; and including a second side facing the first side in a second axial direction, opposite the first axial direction; a first cushion segment fixedly connected to the first and second annular backing plates and including: a radially outermost edge; a first slot extending into the cushion segment in a first circumferential direction; a first edge connecting the first slot and the radially outermost edge; and a second edge extending radially inward from the first slot. The first edge is in contact with the second side and the second edge is separated from the second side by a first distance in the first axial direction; or, the second edge is in contact with the first side and the first edge is separated from the first side by a first distance in the first axial direction.

The present disclosure broadly comprises a clutch plate, including: an axis of rotation; a first annular backing plate with a first side facing in a first axial direction; a second annular backing plate: separated from the first annular backing plate by a gap in a first axial direction; and including a second side facing the first side in a second axial direction, opposite the first axial direction; a first cushion segment: fixedly connected to the first annular backing plate; and, including a first opening, an entirety of which is surrounded by a first material forming the first cushion segment. The first opening includes a first continuous edge formed by the first material. The first continuous edge includes first and second segments. The first segment is in contact with the first side. The second segment is separated from the first side by a first distance in a first axial direction.

The present disclosure broadly comprises a clutch plate, including: an axis of rotation; a first annular backing plate with a first side facing in a first axial direction; a second annular backing plate: separated from the first annular backing plate by a gap in a first axial direction; and including a second side facing the first side in a second axial direction, opposite the first axial direction; a first cushion segment fixedly connected to the first annular backing plate, the first cushion segment including a first radially outermost edge with first and second portions; and a second cushion segment fixedly connected to the second annular backing plate, the second cushion segment including a second radially outermost edge with: a third portion in contact with the first portion; and a fourth portion: aligned with the second portion in a first axial direction; and separated from the second portion by a first distance in the first axial direction.

BRIEF DESCRIPTION OF THE DRAWINGS

The nature and mode of operation of the present disclosure will now be more fully described in the following detailed description of the present disclosure taken with the accompanying figures, in which:

FIG. 11 is a front view of a portion of a prior art clutch plate with conventional cushion segments;

FIG. 12 is a cross-sectional view generally along section line 12-12 in FIG. 11;

FIG. 13 is a front view of a portion of a prior art clutch plate with conventional double cushion segments with wave supports;

FIG. 14 is a cross-sectional view generally along section line 14-14 in FIG. 13;

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Unless defined otherwise, all technical and scientific terms used herein have the same meaning as commonly understood to one of ordinary skill in the art to which this present disclosure belongs. It should be appreciated that the term "substantially" is synonymous with terms such as "nearly", "very nearly", "about", "approximately", "around", "bordering on", "close to", "essentially", "in the neighborhood of", "in the vicinity of", etc., and such terms may be used interchangeably as appearing in the specification and claims. It should be appreciated that the term "proximate" is synonymous with terms such as "nearby", "close", "adjacent", "neighboring", "immediate", "adjoining", etc., and such terms may be used interchangeably as appearing in the specification and claims.

Figure 1:
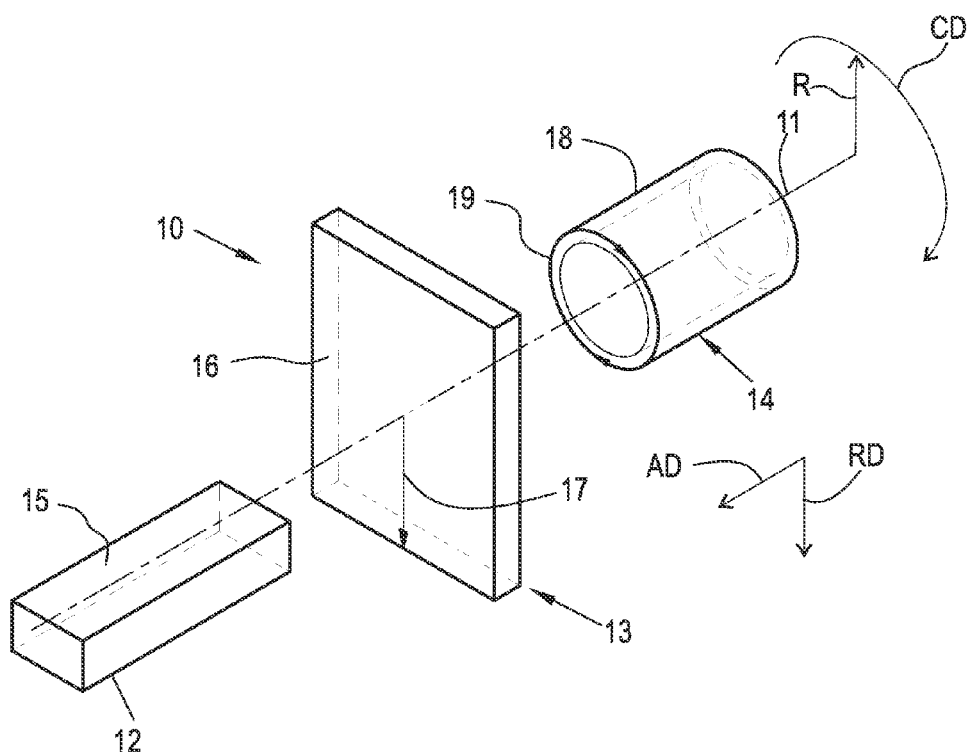
FIG. 1 is a perspective view of a cylindrical coordinate system demonstrating spatial terminology used in the present application.

FIG. 1 is a perspective view of cylindrical coordinate system 10 demonstrating spatial terminology used in the present application. The present application is at least partially described within the context of a cylindrical coordinate system. System 10 includes longitudinal axis 11, used as the reference for the directional and spatial terms that follow. Axial direction AD is parallel to axis 11. Radial direction RD is orthogonal to axis 11. Circumferential direction CD is defined by an endpoint of radius R (orthogonal to axis 11) rotated about axis 11.

To clarify the spatial terminology, objects 12, 13, and 14 are used. An axial surface, such as surface 15 of object 12, is formed by a plane co-planar with axis 11. Axis 11 passes through planar surface 15; however any planar surface co-planar with axis 11 is an axial surface. A radial surface, such as surface 16 of object 13, is formed by a plane orthogonal to axis 11 and co-planar with a radius, for example, radius 17. Radius 17 passes through planar surface 16; however any planar surface co-planar with radius 17 is a radial surface. Surface 18 of object 14 forms a circumferential, or cylindrical, surface. For example, circumference 19 is passes through surface 18. As a further example, axial movement is parallel to axis 11, radial movement is orthogonal to axis 11, and circumferential movement is parallel to circumference 19. Rotational movement is with respect to axis 11. The adverbs "axially," "radially," and "circumferentially" refer to orientations parallel to axis 11, radius 17, and circumference 19, respectively. For example, an axially disposed surface or edge extends in direction AD, a radially disposed surface or edge extends in direction R, and a circumferentially disposed surface or edge extends in direction CD.

Figure 2:
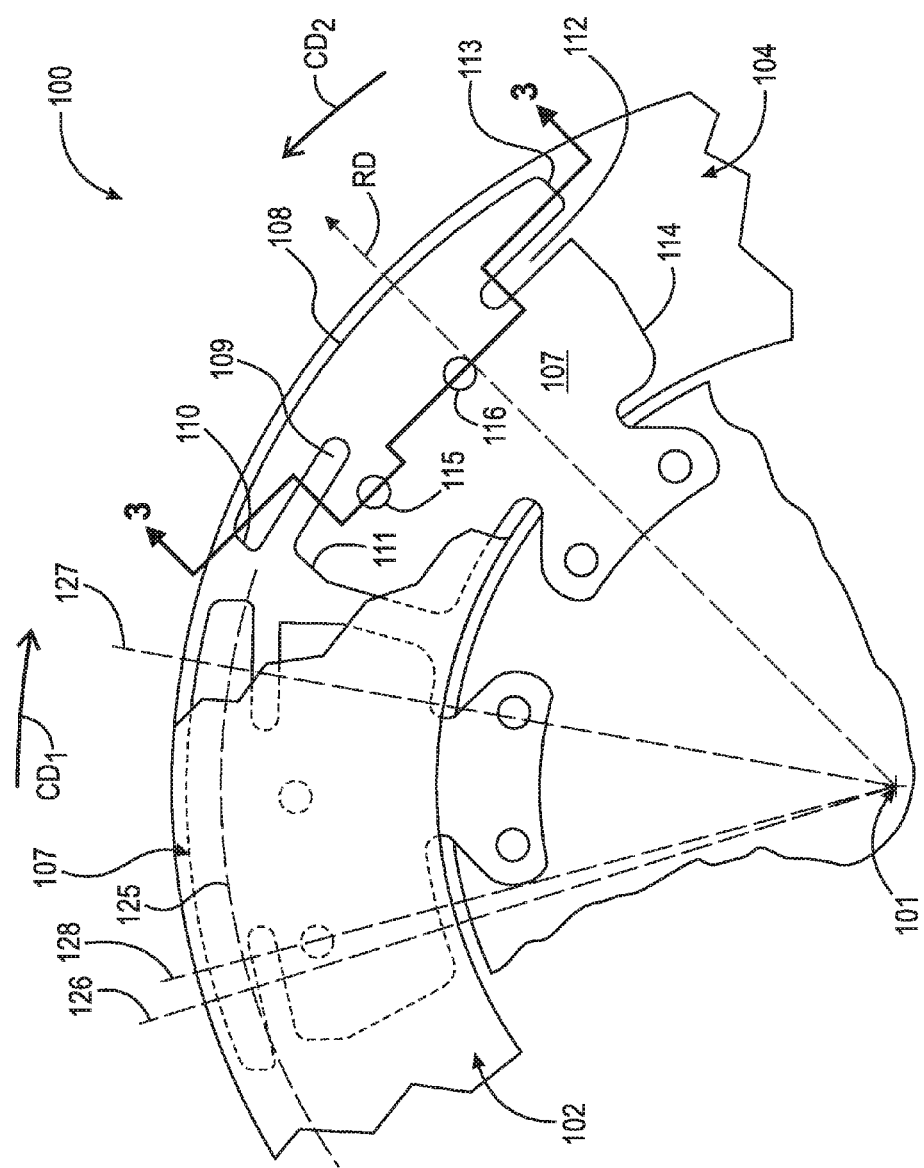
FIG. 2 is a front view of a portion of a clutch plate with 2-stage cushion segments.

FIG. 2 is a front view of a portion of clutch plate 100 with 2-stage cushion segments.

Figure 3:
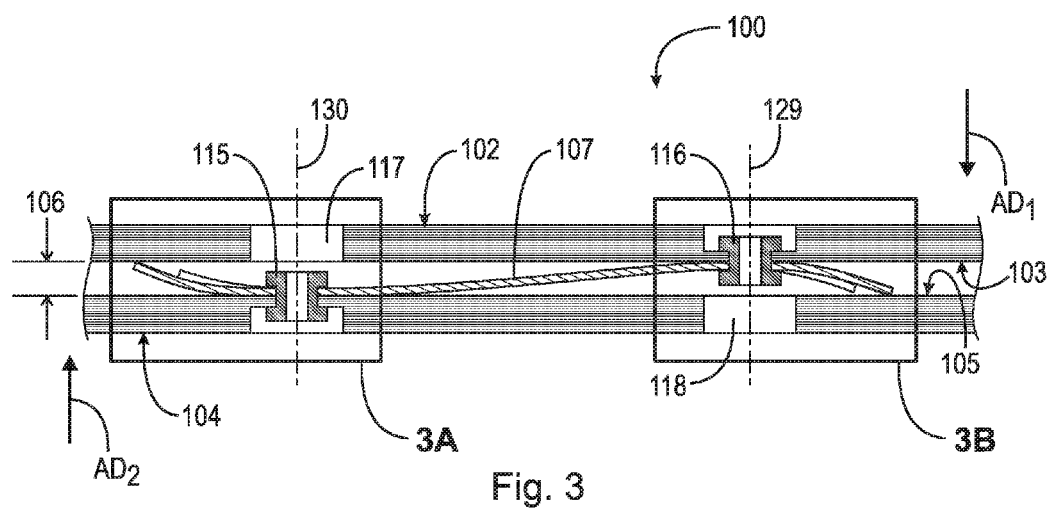
FIG. 3 is a cross-sectional view generally along section line 3-3 in FIG. 2.

FIG. 3 is a cross-sectional view generally along section line 3-3 in FIG. 2.

Figure 3A:
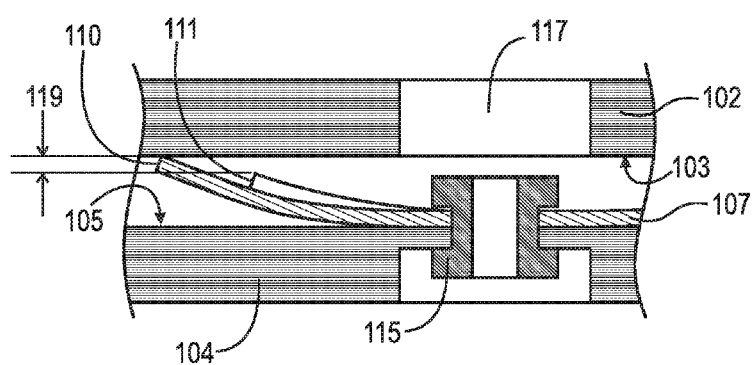
FIG. 3A is a view of portion 3A in FIG. 3.

FIG. 3A is a view of portion 3A in FIG. 3.

Figure 3B:
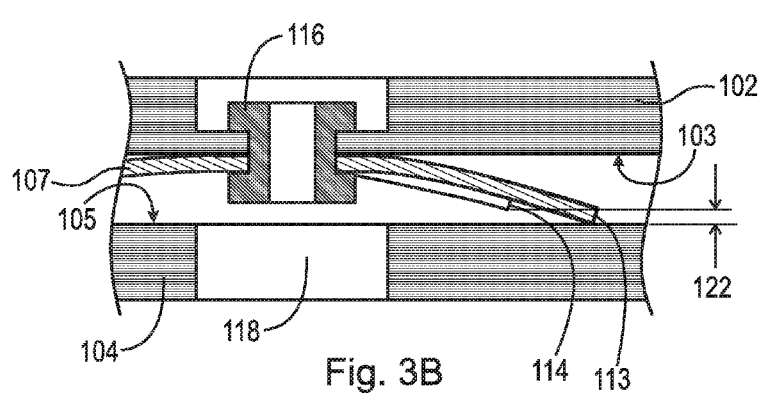
FIG. 3B is a view of portion 3B of FIG. 3.

FIG. 3B is a view of portion 3B in FIG. 3. The following should be viewed in light of FIGS. 2 through 3B. Clutch plate 100 includes axis of rotation 101, annular backing plate 102 with side 103 facing in axial direction $AD_1$, annular backing plate 104, which is separated from annular backing plate 102 by gap 106 in axial direction $AD_1$, and including side 105 facing side 103 in axial direction $AD_2$, opposite axial direction $AD_1$. Clutch plate 100 includes cushion segments 107 fixedly connected to annular backing plates 102 and 104 using fasteners 116 and 115, respectively. In an example embodiment, fasteners 115 and 116 are rivets. The discussion that follows is directed to an individual segment 107 unless noted otherwise; however it should be understood that the discussion is applicable to every segment 107 unless noted otherwise.

Cushion segment 107 includes radially outermost edge 108, slot 109 extending into the cushion segment in circumferential direction $CD_1$, and edge 110 connecting slot 109 and radially outermost edge 108. Cushion segment 107 also includes edge 111 extending radially inward from slot 109. In an example embodiment, edge 110 is in contact with side 103 and edge 111 is separated from side 103 by distance 119 in axial direction $AD_1$. In an example embodiment (not shown), edge 111 is in contact with side 103 and edge 110 is separated from side 103 by distance 119 in axial direction $AD_1$.

In an example embodiment, cushion segment 107 includes: slot 112, which extends into cushion segment 107 in circumferential direction $CD_2$, opposite circumferential direction $CD_1$; edge 113 connecting slot 112 and radially outermost edge 108; and edge 114 extending radially inward from slot 112. In an example embodiment, edge 113 is in contact with side 105 and edge 114 is separated from side 105 by distance 122 in axial direction $AD_1$. In an example embodiment (not shown), edge 114 is in contact with side 105 and edge 113 is separated from side 105 by distance 122 in axial direction $AD_2$. Line 125, in circumferential direction $CD_1$, passes through, in sequence, slot 109, material forming cushion segment 107, and slot 112.

In an example embodiment, line 126, in radial direction RD, orthogonal to axis of rotation 101, passes through slot 109 and radially outermost edge 108. In an example embodiment, line 127, in radial direction RD passes through slot 112 and radially outermost edge 108.

A plurality of cushion segments 107, are axially located within gap 106.

In an example embodiment, fasteners 115 and 116 fixedly connect cushion segment 107 to annular backing plates 104 and 102, respectively. Line 128, in radial direction RD, passes through, in sequence, fastener 115, slot 109, and radially outermost edge 108.

In an example embodiment, annular backing plate 102 includes cavity 117 arranged to receive fastener 115 when the clutch is engaged, and annular backing plate 104 includes cavity 118 arranged to receive fastener 116 when the clutch is engaged. In an example embodiment, fastener 115 is aligned with center line 130 of cavity 117 and fastener 116 is aligned with center line 129 of cavity 118.

As noted above, prior art clutch plate 500 includes cushion segments 507 with smooth radial sides 511, and radially outer edges 512 in contact with the respective friction liners. Thus, clutch plate 500 has a one-stage engagement process. In comparison to clutch plate 500, cushion segment 107 for clutch plate 100 provides a progressive clutch engagement, for example, a two-stage cushion effect. For example, edges 110 and 113 are initially in contact with sides 103 and 105, respectively, and edges 111 and 114 are separated by gaps 119 and 122 from sides 103 and 105, respectively. Thus, during a first stage of clutch engagement, a first level of cushioning is generated by edges 110 and 113. As the clutch engagement progresses, cushion segment 107 is compressed between annular backing plates 102 and 104 until gaps 119 and 122 are eliminated and edges 111 and 114 contact sides 103 and 105, respectively. Once edges 111 and 114 are in contact with sides 103 and 105, respectively, a second level of cushion effect, supplementing the first cushion effect is implemented.

The sequential application and combination of the cushion effects of edge 110 and edge 111 as the clutch engagement progresses creates good clutch engagement characteristics. The cushion effects of edge 110 and edge 111 can be modified by changing various qualities of the clutch plate, such as the material used in cushion segment 107 and the geometric characteristics of edge 110 and edge 111, such as areal size, thickness, and length. Such changes alter the deflection energy of edge 110 and edge 111, and by changing these qualities, the clutch engagement characteristics can be optimized in specific applications.

In an example embodiment (not shown), both edge 110 and edge 111 are separated from side 105 by respective distances in axial direction $AD_1$. As the clutch is engaged, edge 110 and edge 111 are sequentially brought into contact with side 105 by virtue of their unequal initial distances from side 105. This sequential contact with side 105 combines the cushion effects of edge 110 and edge 111 and creates good clutch engagement characteristics.

The discussion for side 103 and edges 110 and 111 is applicable to side 105 and edges 113 and 114.

Figure 4:
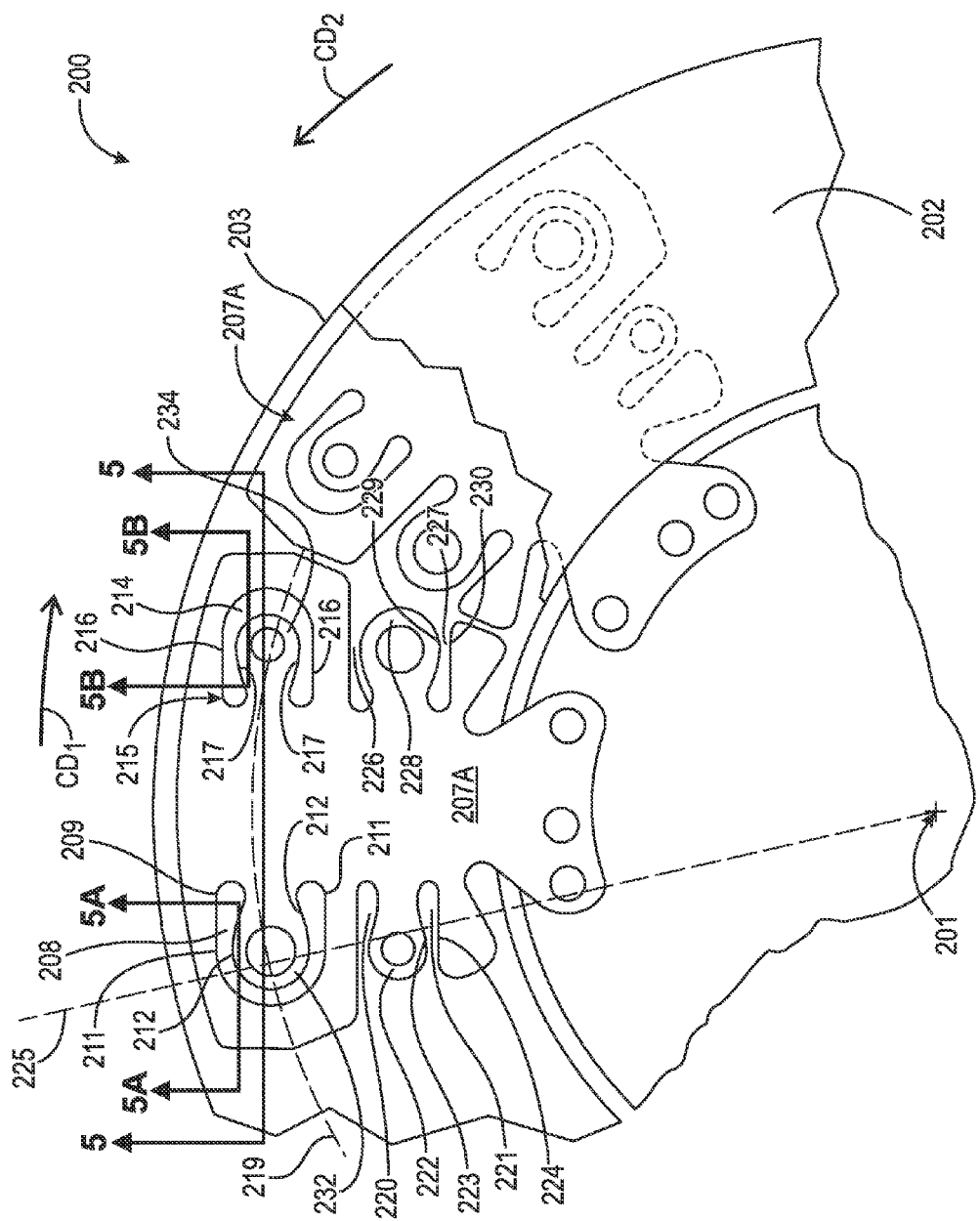
FIG. 4 is a front view of a portion of a clutch plate with cushion segments of double segment design.

FIG. 4 is a front view of a portion of clutch plate 200 with cushion segments of double segment design.

Figure 5:
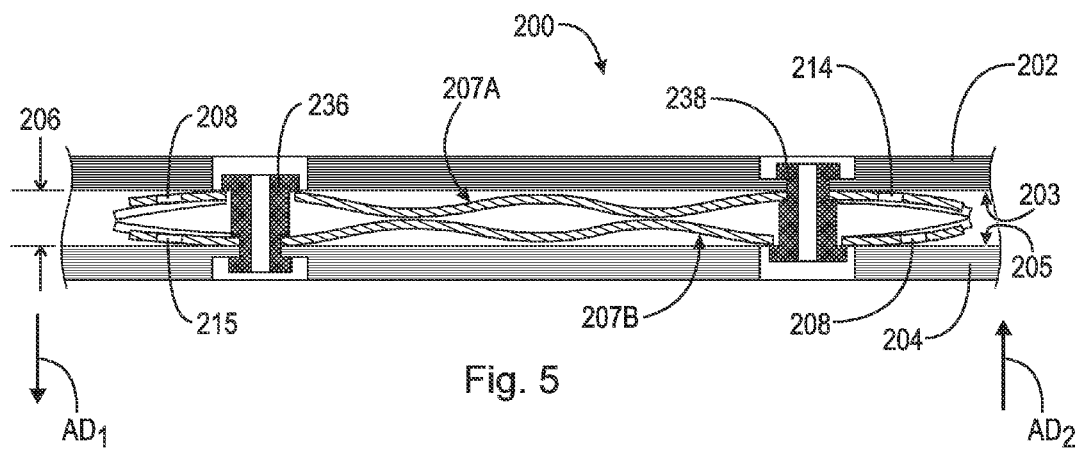
FIG. 5 is a cross-sectional view generally along section line 5-5 in FIG. 4.

FIG. 5 is a cross-sectional view along section line 5-5 showing a portion of a clutch plate with wave supports of double segment design.

Figure 5A:
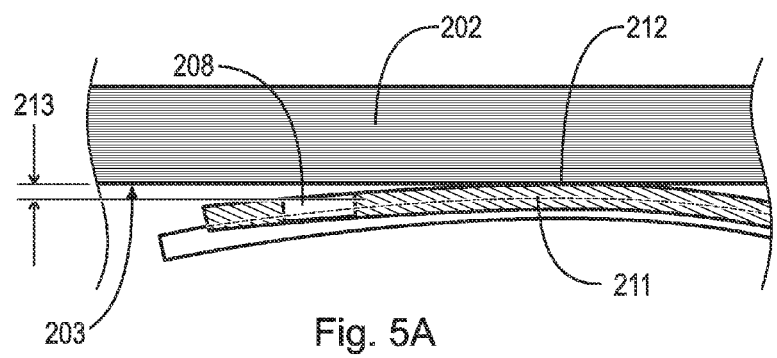
FIG. 5A is a cross-sectional view generally along section line 5A-5A in FIG. 4.

FIG. 5A is a view of portion 5A in FIG. 5.

Figure 5B:
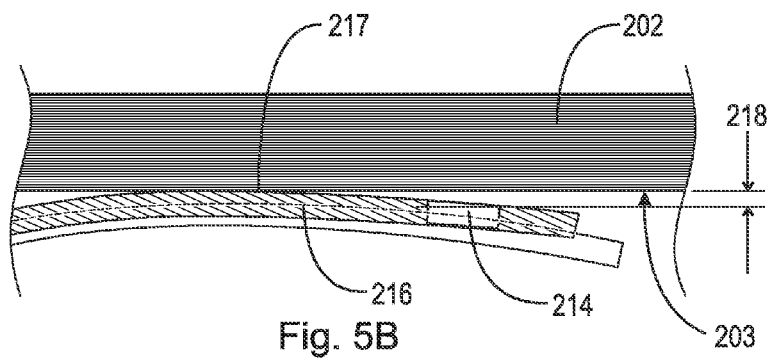
FIG. 5B is a cross-sectional view generally along section line 5B-5B in FIG. 4.

FIG. 5B is a view of portion 5B in FIG. 5. The following should be viewed in light of FIGS. 4 through 5B. Clutch plate 200 includes axis of rotation 201, annular backing plate 202 with side 203 facing in axial direction $AD_1$, annular backing plate 204 separated from annular backing plate 202 by gap 206 in axial direction $AD_1$ and including side 205 facing side 203 in axial direction $AD_2$, opposite axial direction $AD_1$. Clutch plate 200 also includes cushion segments 207A, fixedly connected to annular backing plate 202, and cushion segments 207B, fixedly connected to backing plate 204. The discussion that follows is directed to an individual segment 207A unless noted otherwise; however it should be understood that the discussion is applicable to every segment 207A and 207B unless noted otherwise.

Cushion segment 207A includes opening 208, the entirety of which is surrounded by material forming cushion segment 207. Opening 208 includes continuous edge 209 formed by the material forming cushion segment 207A. Continuous edge 209 includes at least one segment 211 and at least one segment 212. Segment 212 is in contact with side 203, and segment 211 is separated from side 203 by distance 213 in axial direction $AD_1$.

In an example embodiment, cushion segment 207A includes opening 214, the entirety of which is surrounded by forming cushion segment 207A. Opening 214 includes continuous edge 215 formed by material 210. Continuous edge 215 includes at least one segment 216 and at least one segment 217. Segment 217 is in contact with side 203, segment 216 is separated from side 203 by distance 218 in axial direction $AD_1$. Line 219 in circumferential direction $CD_1$ passes through openings 208 and 214.

In an example embodiment, cushion segment 207A includes slots 220 and 221 extending into cushion segment 207 in circumferential direction $CD_1$ and forming protrusion 222. Slot 221 include edges 223 and 224, respectively. Protrusion 222 is radially disposed between slots 220 and 221. Edge 223 is in contact with side 203, and edge 224 is separated from side 203 by distance 213 in axial direction $AD_1$.

In an example embodiment, straight line 225 passes through segment 211, segment 212, edge 223, and edge 224.

In an example embodiment, cushion segment 207A includes slots 226 and 227 extending into cushion segment 207A in circumferential direction $CD_2$ and forming protrusion 228, radially disposed between slots 226 and 227. Slot 227 includes edge 229 and 230. Edge 229 is in contact with side 205, and edge 230 is separated from side 205 by distance 218 in axial direction $AD_2$.

Protrusions 232 and 234 are formed by openings 208 and 214, respectively. In an example embodiment, fasteners 236 and 238 pass through protrusions 232 and 234 of segment 207A, respectively, with fastener 238 arranged to fixedly connect protrusion 234 to annular backing plate 202. Fasteners 236 and 238 pass through protrusions 234 and 232 of segment 207B, respectively, with fastener 236 arranged to fixedly connect protrusion 232 to annular backing plate 204.

As noted above, prior art clutch plate 600 includes cushion segments 607 and 608 with respective smooth radial sides 611 in contact. Thus, clutch plate 600 has a one-stage engagement process. In comparison to clutch plate 600, cushion segments 207A and 207B for clutch plate 200 provide a progressive clutch engagement, for example, a two-stage cushion effect. For example, segments 212 and 217 are initially in contact with side 203, and segments 211 and 216 are separated by gaps 213 and 218, respectively, from side 203. In an example embodiment, the discussion for segments 212, 217, 211 and 216 and gaps 213 and 218 is applicable to side 205 as well. Thus, during a first stage of clutch engagement, a first level of cushioning is generated by segments 212 and 217. As the clutch engagement progresses, cushion segments 207A and 207B are compressed between annular backing plates 202 and 204 until gaps 213 and 218 are eliminated and segments 211 and 216 contact side 103. Once segments 211 and 216 are in contact with side 103, a second level of cushion effect, supplementing the first cushion effect is implemented.

In like manner, in an example embodiment: edge 223 in contact with side 203; edge 224 separated from side 203 by distance 213; edge 229 in contact with side 205; and edge 230 separated from side 205 by distance 218 also provide two-stage cushioning. For example, edge 223 provides initial cushioning and edge 224 provides further cushioning as segments 207A and 207B are compressed.

The sequential application and combination of the cushion effects of segments 212 and 217 and segments 211 and 216 as the clutch engagement progresses creates good clutch engagement characteristics. The cushion effects of segments 212 and 217 and segments 211 and 216 can be modified by changing various qualities of the clutch plate, such as the material used in segment and the geometric characteristics of segments 212 and 217 and segments 211 and 216, such as areal size, thickness, and length. Such changes alter the deflection energy of segments 212 and 217 and segments 211 and 216, and by changing these qualities, the clutch engagement characteristics can be optimized in specific applications. The preceding discussion is applicable to edge 223 in contact with side 203; edge 224 separated from side 203 by distance 213; edge 229 in contact with side 205; and edge 230 separated from side 205 by distance 218.

Figure 6:
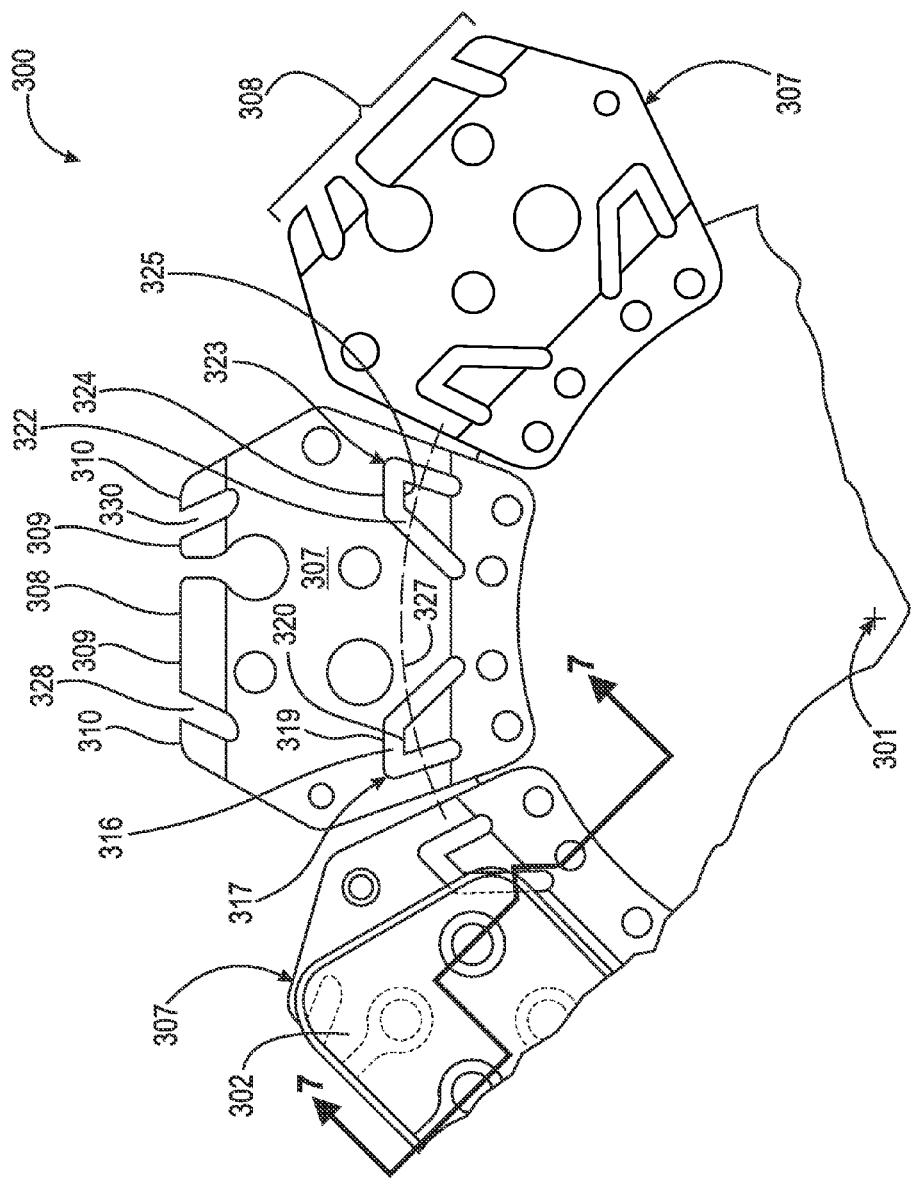
FIG. 6 is a front view of a portion of a clutch plate with cushion segments having 2-stage engagement.

FIG. 6 is a front view of a portion of clutch plate 300 with cushion segments having 2-stage engagement.

Figure 7:
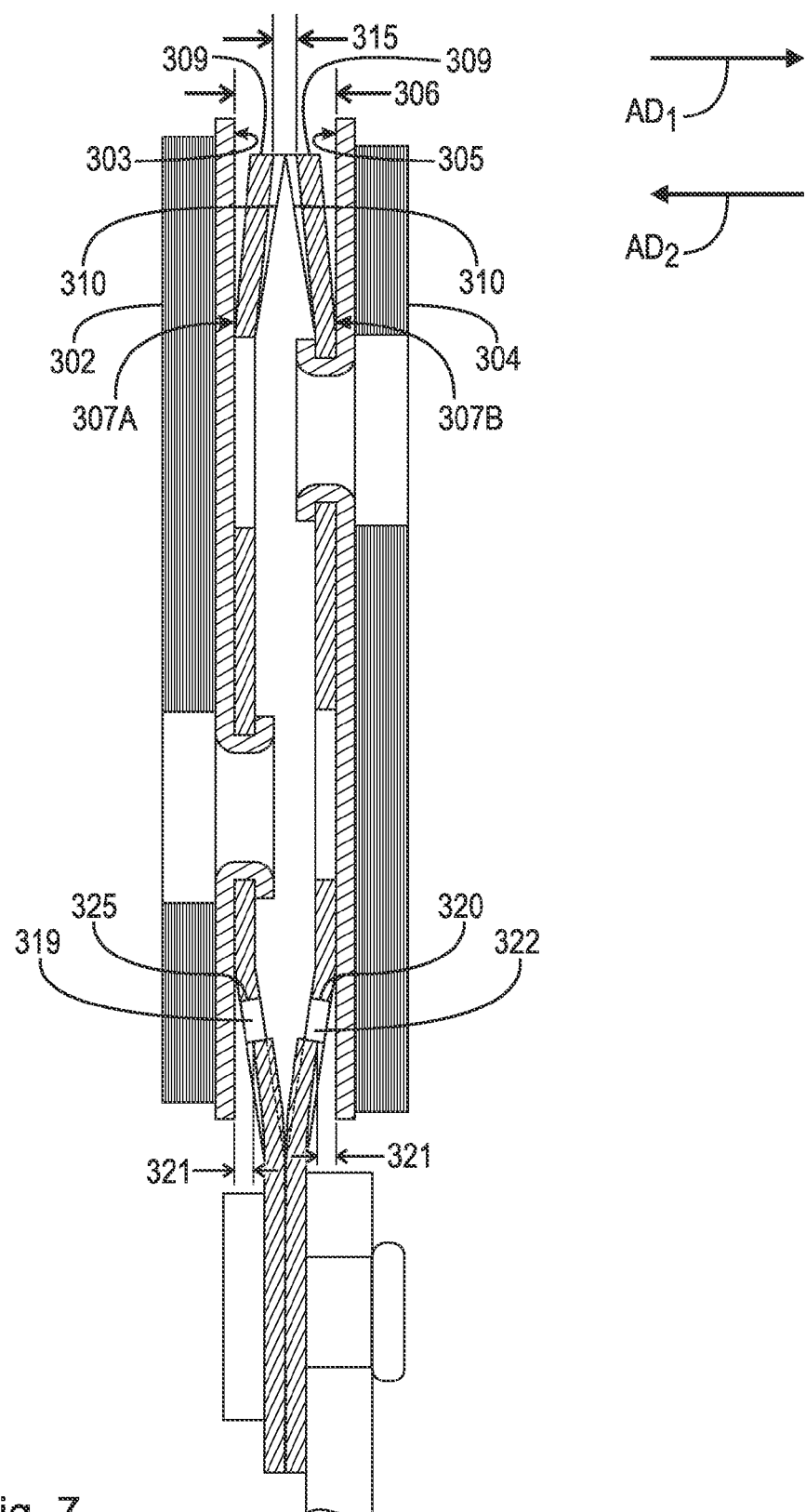
FIG. 7 is a cross-sectional view generally along section line 7-7 in FIG. 6.

FIG. 7 is a cross-sectional view generally along section line 7-7. The following should be viewed in light of FIGS. 6 and 7. Clutch plate 300 includes axis of rotation 301 and annular backing plate 302 with side 303 facing in axial direction $AD_1$. Clutch plate 300 also includes annular backing plate 304 separated from annular backing plate 302 by gap 306 in axial direction $AD_1$. Backing plate 304 includes side 305 facing side 303 in axial direction $AD_2$. Clutch plate 300 includes: cushion segments 307A fixedly connected to annular backing plate 302; and cushion segments 307B fixedly connected to annular backing plate 304. The discussion that follows is directed to an individual segment 307A unless noted otherwise; however it should be understood that the discussion is applicable to every segment 307A and 307B unless noted otherwise.

Cushion segment 307A includes radially outermost edge 308 with portions 309 and 310. Respective portions 310 of axially facing segments 307A and 307B are in contact and respective portions 309 of axially facing segments 307A and 307B are separated distance 315 in axial direction $AD_1$.

In an example embodiment, cushion segment 307A includes opening 316, the entirety of which is surrounded by material forming cushion segment 307A. Opening 316 includes continuous edge 317 formed by the material forming cushion segment 307A. Continuous edge 317 includes segment 319 in contact with side 303 (for segment 307A) or side 305 (for segment 3079). Edge 317 includes segment 320 separated from side 303 (for segment 307A) or side 305 (for segment 307B) by distance 321 in axial direction $AD_1$ or $AD_2$, respectively.

In an example embodiment, cushion segment 307A includes opening 322, the entirety of which is surrounded by material forming cushion segment 307A. Opening 322 includes continuous edge 323 formed by the material forming cushion segment 307A. Continuous edge 323 includes segment 324 in contact with side 303 (for segment 307A) or side 305 (for segment 307B). Edge 323 includes segment 325 separated from side 303 (for segment 307A) or side 305 (for segment 307B) by distance 326 in axial direction $AD_1$ or $AD_2$, respectively.

In an example embodiment, line 327 in a circumferential direction $CD_1$ passes through openings 316 and 322. In an example embodiment, cushion segment 307 includes slots 328 and 330 extending at least partially radially inward from radially outermost edge 308. Portion 309 is sandwiched between slots 328 and 330.

As noted above, prior art clutch plate 700 includes cushion segments 707 with respective radially outermost edges 711 in contact. Thus, clutch plate 700 has a one-stage engagement process. In comparison to clutch plate 700, cushion segments 307A and 307B for clutch plate 300 provide a progressive clutch engagement, for example, a two-stage cushion effect. For example, respective portions 310 of cushion segments 307A and 307B are initially in contact with each other, and respective portions 309 of cushion segments 307A and 307B are separated by gap 315 from each other. Thus, during a first stage of clutch engagement, a first level of cushioning is generated by portions 310. As the clutch engagement progresses, cushion segments 307A and 307B are compressed between annular backing plates 302 and 304 until gap 315 is eliminated and respective portions 309 contact each other. Once respective portions 309 are in contact with each other, a second level of cushion effect, supplementing the first cushion effect is implemented.

In like manner, in an example embodiment: segments 319, 320, 324 and 325 also provide two-stage cushioning. For example, edge 319 provides initial cushioning and edge 320 provides further cushioning as segments 307A and 307B are compressed The sequential application and combination of the cushion effects of respective portions 310 and respective portions 309 as the clutch engagement progresses creates good clutch engagement characteristics. The cushion effects of respective portions 310 and respective portions 309 can be modified by changing various qualities of the clutch plate, such as the material used in segments and the geometric characteristics of respective portions 310 and respective portions 309, such as areal size, thickness, and length. Such changes alter the deflection energy of respective portions 310 and respective portions 309, and by changing these qualities, the clutch engagement characteristics can be optimized in specific applications. The preceding discussion is applicable to segments 319, 320, 324 and 325.

Figure 8:
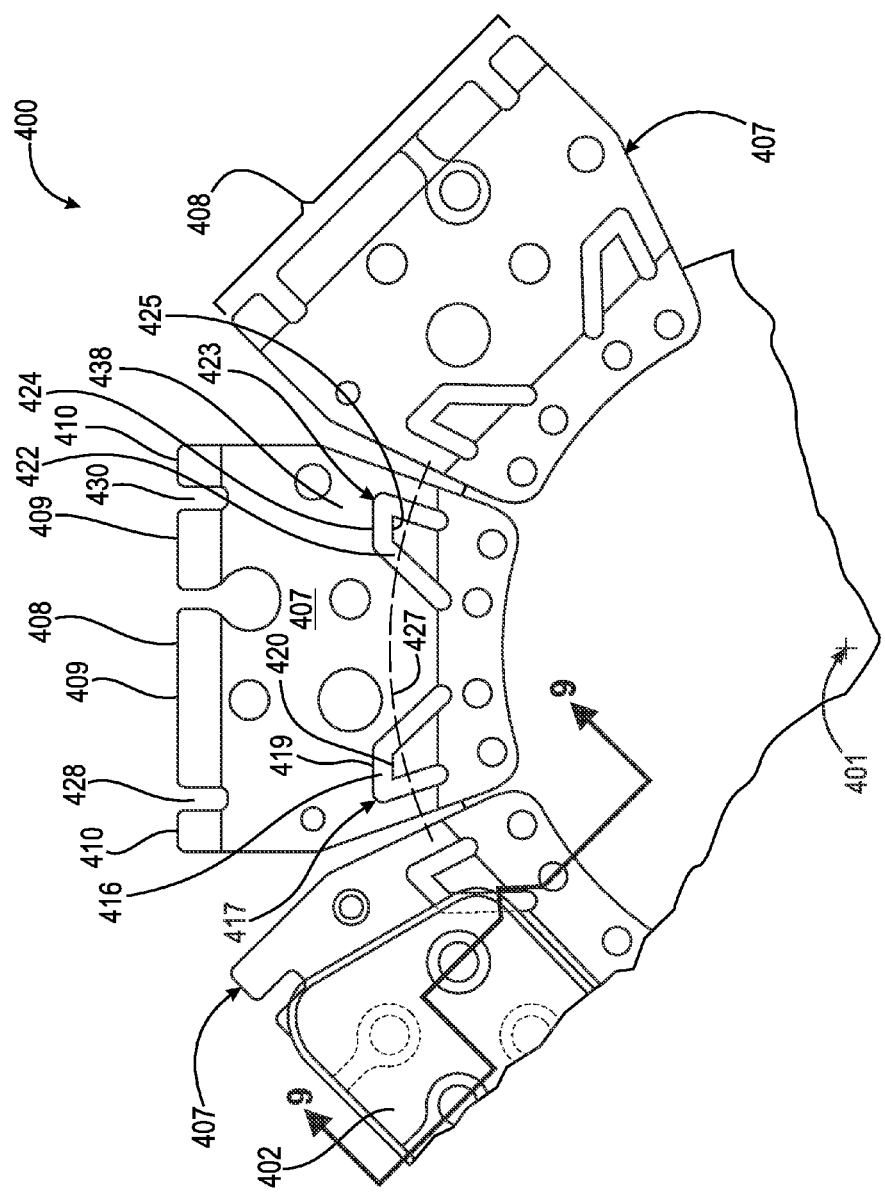
FIG. 8 is a front view of a portion of a clutch plate with cushion segments having 2-stage engagement.

FIG. 8 is a front view of a portion of clutch plate 400 with cushion segments having 2-stage engagement.

Figure 9:
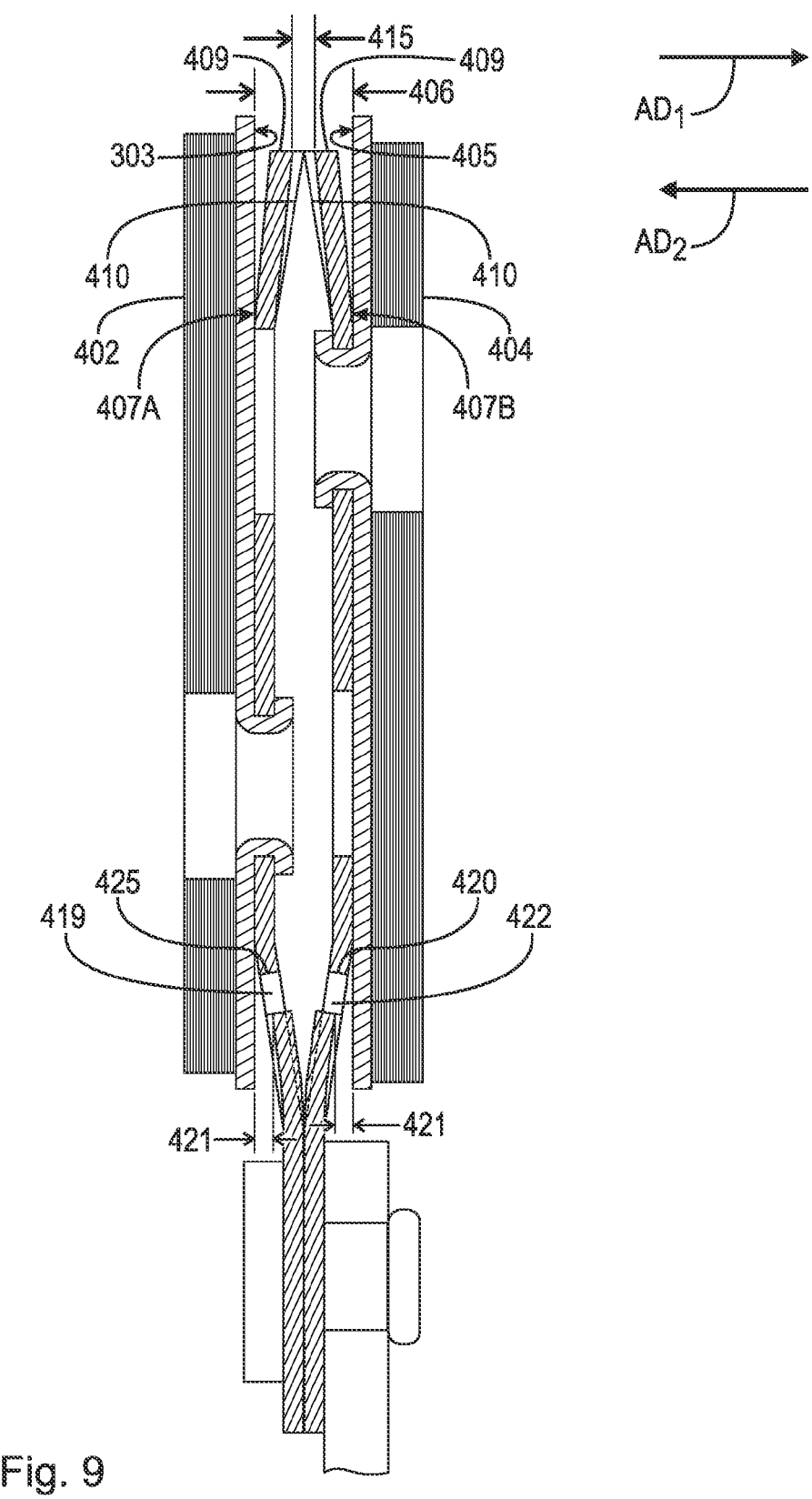
FIG. 9 is a cross-sectional view generally along section line 9-9 in FIG. 8.

FIG. 9 is a cross-sectional view generally along section line 9-9. The following should be viewed in light of FIGS. 8 and 9. The cushion segments depicted in FIGS. 8 and 9 are formed with longer radially outermost edges, as compared to the cushion segments depicted in FIGS. 6 and 7. Clutch plate 400 includes axis of rotation 401, annular backing plate 402 with side 403 facing in axial direction $AD_1$. Clutch plate 400 also includes annular backing plate 404 separated from annular backing plate 402 by gap 406 in axial direction $AD_1$. Annular backing plate 404 includes side 405 facing side 403 in axial direction $AD_2$. Clutch plate 400 also includes cushion segments 407A fixedly connected to annular backing plate 402 and cushion segments 407B fixedly connected to backing plate 404. The discussion that follows is directed to an individual segment 407A unless noted otherwise; however it should be understood that the discussion is applicable to every segment 407A and 407B unless noted otherwise.

Cushioning segment 407A includes radially outermost edge 408 with portions 409 and 410. Respective portions 410 of axially facing segments 407A and 407B are in contact and respective portions 409 of axially facing segments 407A and 407B are separated distance 415 in axial direction $AD_1$.

In an example embodiment, cushion segment 407A includes opening 416, the entirety of which is surrounded by material forming cushion segment 407A. Opening 416 includes continuous edge 417 formed by the material forming cushion segment 407A. Continuous edge 417 includes segment 419 in contact with side 403 (for segment 407A) or side 405 (for segment 407B). Edge 417 includes segment 420 separated from side 403 (for segment 407A) or side 405 (for segment 407B) by distance 421 in axial direction $AD_1$ or $AD_2$, respectively.

In an example embodiment, cushion segment 407A includes opening 422, the entirety of which is surrounded by material forming cushion segment 407A. Opening 422 includes continuous edge 423 formed by the material forming cushion segment 407A. Continuous edge 423 includes segment 424 in contact with side 403 (for segment 407A) or side 405 (for segment 407B). Edge 423 includes segment 425 separated from side 403 (for segment 407A) or side 405 (for segment 407B) by distance 426 in axial direction $AD_1$ or $AD_2$, respectively.

In an example embodiment, line 427 in a circumferential direction $CD_1$ passes through openings 416 and 422. In an example embodiment, cushion segment 407 includes slots 428 and 430 extending at least partially radially inward from radially outermost edge 408. Portion 409 is sandwiched between slots 428 and 430.

As noted above, prior art clutch plate 700 includes cushion segments 707 with respective radially outermost edges 711 in contact. Thus, clutch plate 700 has a one-stage engagement process. In comparison to clutch plate 700, cushion segments 407A and 407B for clutch plate 400 provide a progressive clutch engagement, for example, a two-stage cushion effect. For example, respective portions 410 of cushion segments 407A and 407B are initially in contact with each other, and respective portions 409 of cushion segments 407A and 407B are separated by gap 415 from each other. Thus, during a first stage of clutch engagement, a first level of cushioning is generated by portions 410. As the clutch engagement progresses, cushion segments 407A and 407B are compressed between annular backing plates 402 and 404 until gap 415 is eliminated and respective portions 409 contact each other. Once respective portions 409 are in contact with each other, a second level of cushion effect, supplementing the first cushion effect is implemented.

In like manner, in an example embodiment: segments 419, 420, 424 and 425 also provide two-stage cushioning. For example, edge 419 provides initial cushioning and edge 420 provides further cushioning as segments 407A and 407B are compressed The sequential application and combination of the cushion effects of respective portions 410 and respective portions 409 as the clutch engagement progresses creates good clutch engagement characteristics. The cushion effects of respective portions 410 and respective portions 409 can be modified by changing various qualities of the clutch plate, such as the material used in segments and the geometric characteristics of respective portions 410 and respective portions 409, such as areal size, thickness, and length. Such changes alter the deflection energy of respective portions 410 and respective portions 409, and by changing these qualities, the clutch engagement characteristics can be optimized in specific applications. The preceding discussion is applicable to segments 419, 420, 424 and 425.

Figure 10A:
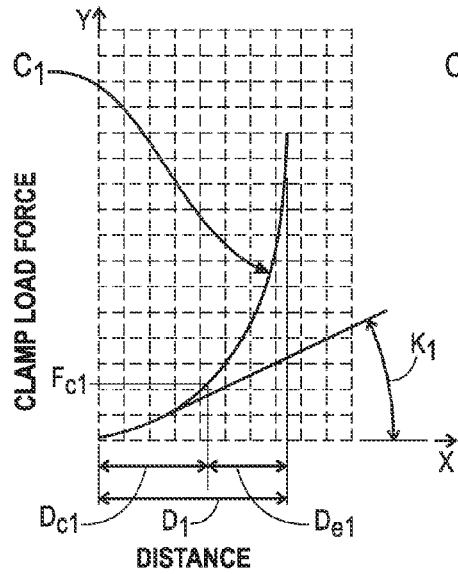
FIG. 10A is a graph showing the engagement characteristics of a clutch with good clutch engagement characteristics.

FIG. 10A is a graph showing the engagement characteristics of a clutch with good clutch engagement characteristics, as represented by solid-line curve $C_1$. The x-axis of the graph represents the clutch pressure plate lift travel distance, which corresponds to the distance the clutch pedal actuated by the vehicle driver travels from initial engagement of the clutch elements to complete engagement of the clutch. The y-axis of the graph represents the clamp load force experienced by the clutch. Distance $D_1$ comprises one portion, namely launching cushion distance $D_{c1}$, and another portion, namely, engagement distance $D_{e1}$. Launching cushion distance $D_{c1}$ corresponds to the distance the pedal travels from initial engagement of the clutch elements to the point at which clamp load force $F_{e1}$ is achieved. Clamp load force $F_{e1}$ is the clamp load force needed to launch the vehicle. The engagement characteristics of the portion of the pedal travel within cushion distance $D_{c1}$ are dominated by the cushioning features of the clutch. Engagement distance $D_{e1}$ corresponds to the distance the pedal travels from the point at which damp load force $F_{c1}$ is achieved to complete engagement of the clutch. Slope $K_1$ is a characteristic based the relationship between on launching cushion distance $D_{c1}$ and clamp load force $F_{c1}$ and is responsible for the subjective quality of the clutch engagement performance perceived by the vehicle driver. A smaller slope $K_1$ provides the driver with a subjectively better clutch engagement experience, because the driver has more distance in which to modulate the clutch to launch the vehicle.

Figure 10B:
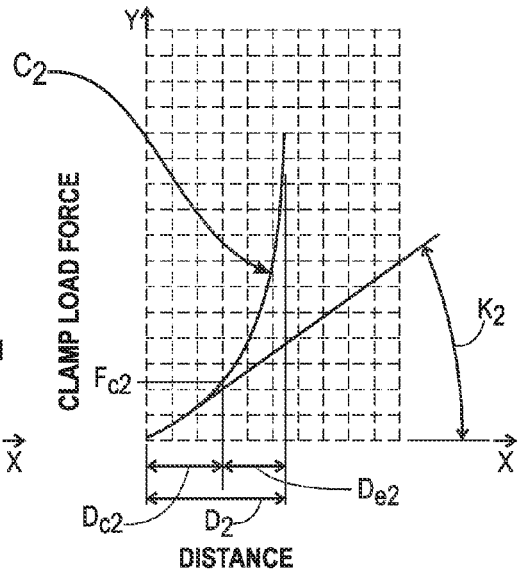
FIG. 10B is a graph showing the engagement characteristics of a clutch with poor clutch engagement characteristics.

FIG. 10B is a graph showing the engagement characteristics of a clutch with poor clutch engagement characteristics, as represented by solid-line curve $C_2$. The x-axis of the graph represents the clutch pressure plate lift travel distance, which corresponds to the distance the clutch pedal actuated by the vehicle driver travels from initial engagement of the clutch elements to complete engagement of the clutch. The y-axis of the graph represents the clamp load force experienced by the clutch. Distance $D_2$ comprises one portion, namely launching cushion distance $D_{c2}$, and another portion, namely, engagement distance $D_{e2}$. Launching cushion distance $D_{c2}$ corresponds to the distance the pedal travels from initial engagement of the clutch elements to the point at which clamp load force $F_{c2}$ is achieved. Clamp load force $F_{c2}$ is the clamp load force needed to launch the vehicle. The engagement characteristics of the portion of the pedal travel within cushion distance $D_{c2}$ are dominated by the cushioning features of the clutch. Engagement distance $D_{e2}$ is the distance the pedal travels from the point at which clamp load force $F_{c2}$ is achieved to complete engagement of the clutch.

Slope $K_2$ is a characteristic based on the relationship between launching cushion distance $D_{c2}$ and clamp load force $F_{c2}$ and is responsible for the subjective quality of the clutch engagement performance perceived by the vehicle driver. In this figure, the larger slope $K_2$ as compared to the slope $K_1$ in FIG. 10A provides the driver with a subjectively worse clutch engagement experience, because the driver has less distance in which to modulate the clutch to launch the vehicle. Although clamp load force $F_{c1}$ in FIG. 10A and clamp load force $F_{c2}$ in FIG. 10B are the same, the reduction of cushion distance $D_{c2}$ in FIG. 1B as compared to cushion distance $D_{c1}$ in FIG. 10A makes it more difficult for the driver to modulate the clutch to achieve clamp load force $F_{c2}$ without undesirable side-effects, such as engagement chatter or engine stalling. Traditionally, the design of the clutch, and specifically the clutch plate, can be adjusted to increase cushion distance $D_{c2}$ so that the clutch engagement characteristics approach "good enough," while the overall design of the clutch remains within cost and timing considerations, though this may not always be possible.

Figure 10C:
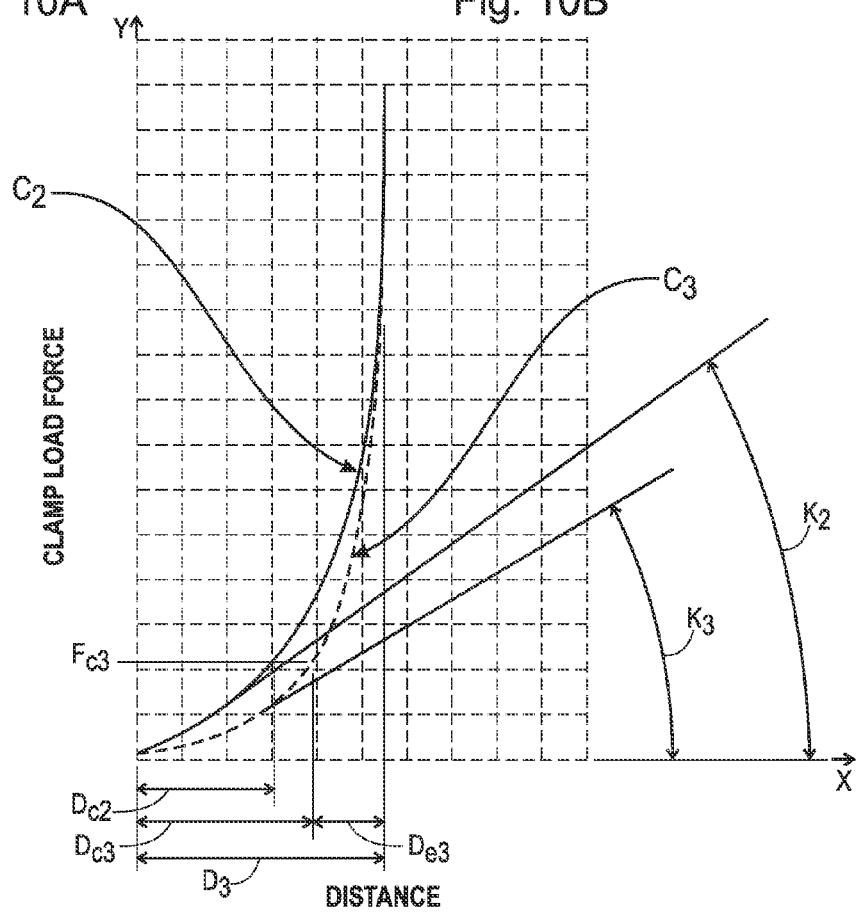
FIG. 10C is a graph showing the engagement characteristics of a clutch with progressive engagement and good clutch engagement characteristics.
Figure 15:
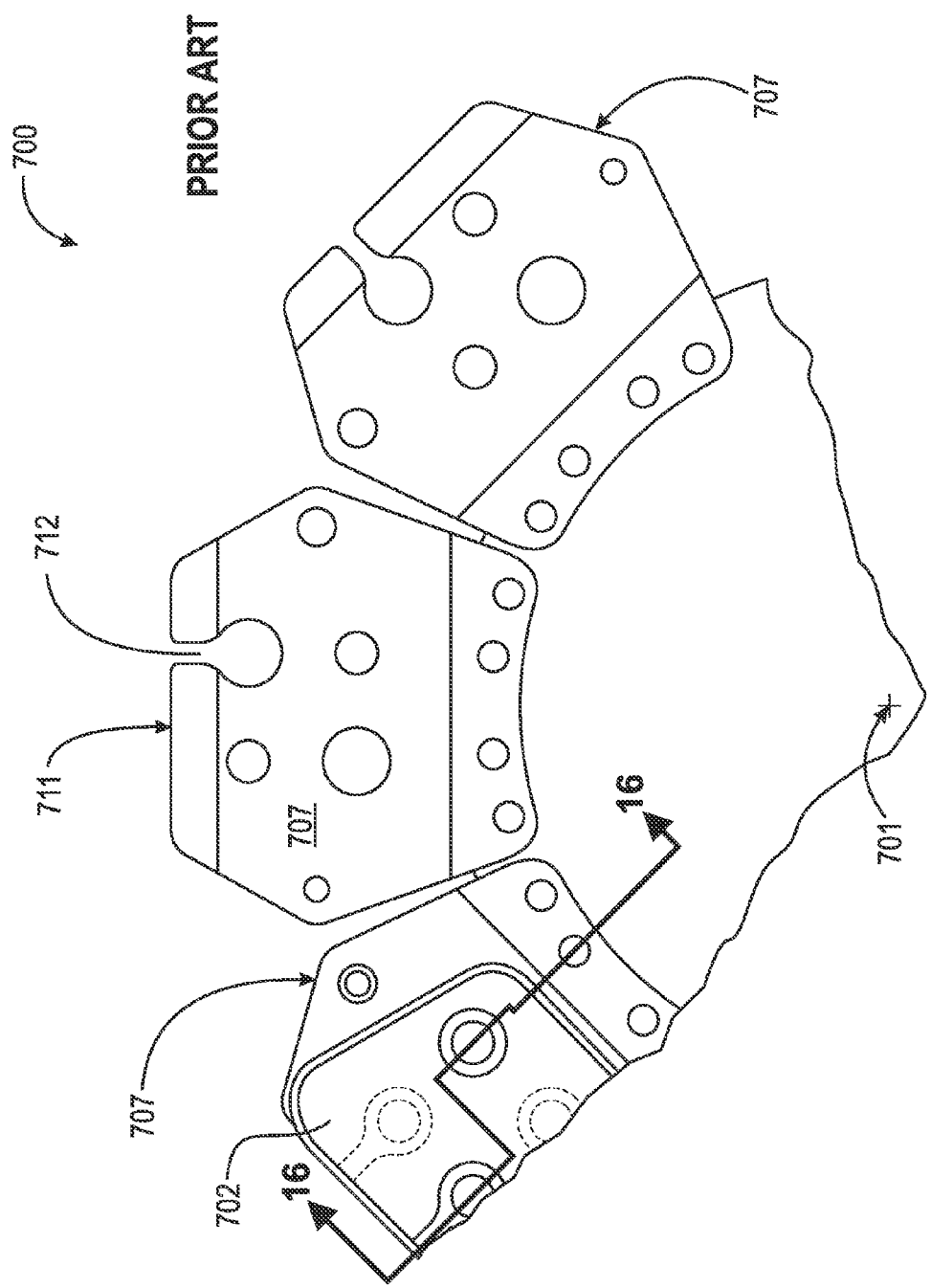
FIG. 15 is a front view of a portion of a prior art clutch plate with conventional double cushion segments used with cera-metallic pads as friction material; and, FIG. 16 is a cross-sectional view generally along section line 16-16 in FIG. 15.
Figure 16:
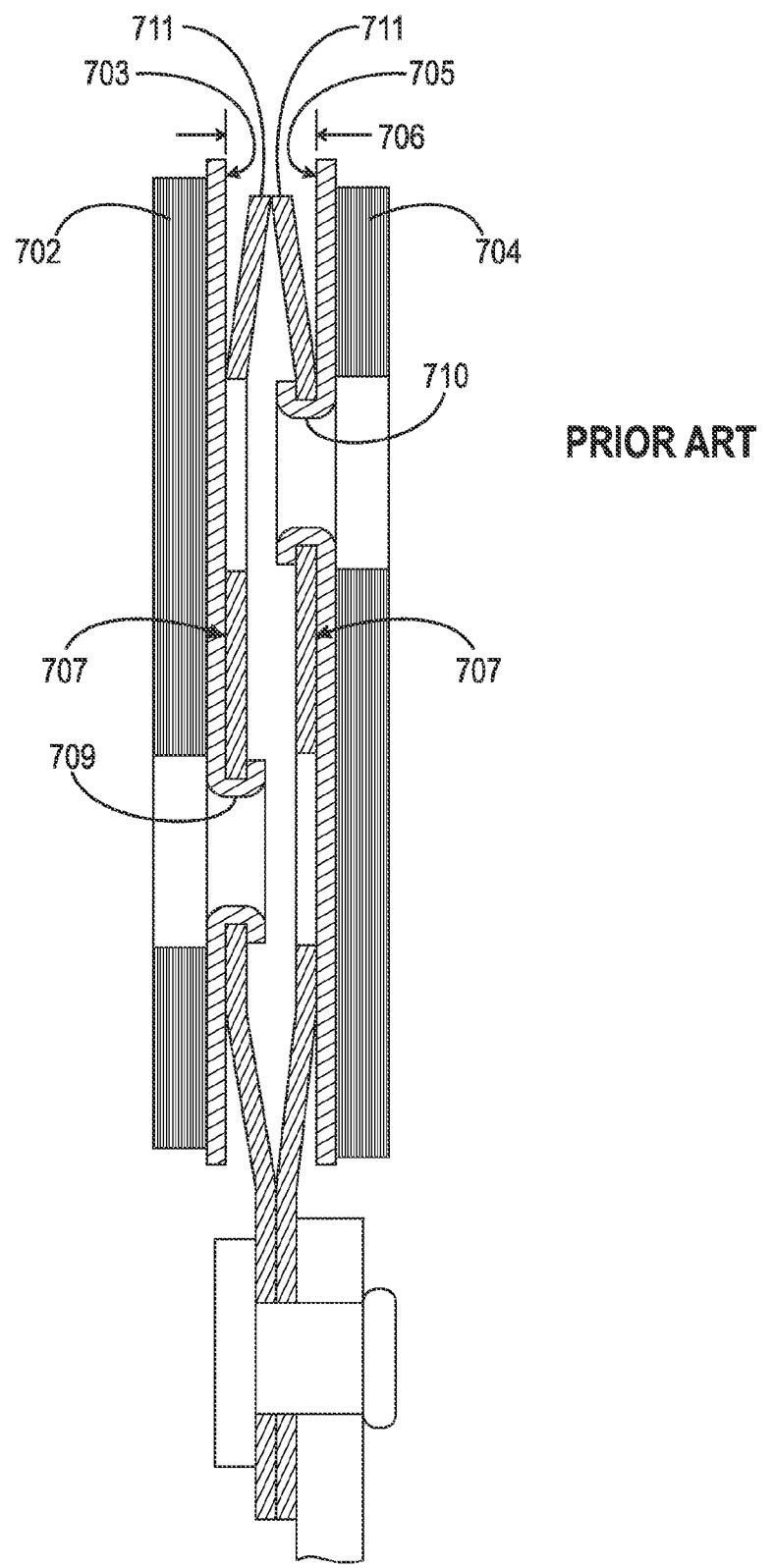

FIG. 10C is a graph showing the engagement characteristics of a clutch with progressive engagement and good clutch engagement characteristics, as represented by dashed-line curve $C_3$. The x-axis of the graph represents the clutch pressure plate lift travel distance, which corresponds to the distance the clutch pedal actuated by the vehicle driver travels from initial engagement of the clutch elements to complete engagement of the clutch. The y-axis of the graph represents the clamp load force experienced by the clutch. Distance $D_3$ comprises a portion, namely launching cushion distance $D_{c3}$, and a portion, namely, engagement distance $D_{e3}$. Launching cushion distance $D_{c3}$ corresponds to the distance the pedal travels from initial engagement of the clutch elements to the point at which clamp load force $F_{c3}$ is achieved. Clamp load force $F_{c3}$ is the clamp load force needed to launch the vehicle. Slope $K_3$ is a characteristic based on the relationship between launching cushion distance $D_{c3}$ and clamp load force $F_{c3}$. Also included in FIG. 10C is cushion distance $D_{c2}$, as shown on solid-line curve $C_2$, and slope $K_2$ for comparison with cushion distance $D_{c3}$ and slope $K_3$. Due to the progressive engagement of the clutch plate with cushion segments having dual engagement characteristics cushion distance $D_{c3}$ is greater than cushion distance $D_{c2}$. This results in slope $K_3$ being smaller than slope $K_2$ and a subjectively better clutch engagement experience for the driver.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A clutch plate, comprising:
an axis of rotation;
a first annular backing plate with a first side facing in a first axial direction;
a second annular backing plate:
   separated from the first annular backing plate by a gap in the first axial direction; and,
   including a second side facing the first side in a second axial direction, opposite the first axial direction;
a first cushion segment fixedly connected to the first and second annular backing plates and including:
   a radially outermost edge;
   a first slot extending into the cushion segment in a first circumferential direction;
   a first edge connecting the first slot and the radially outermost edge; and,
   a second edge extending radially inward from the first slot, wherein:
the first edge is in contact with the second side and the second edge is separated from the second side by a first distance in the first axial direction; or,
the second edge is in contact with the first side and the first edge is separated from the first side by a first distance in the first axial direction.

2. The clutch plate of claim 1, wherein:
the first cushion segment includes:
   a second slot extending into the cushion segment in a second circumferential direction, opposite the first circumferential direction;
   a third edge connecting the second slot and the radially outermost edge; and,
   a fourth edge extending radially inward from the second slot;
the third edge is in contact with the second side and the fourth edge is separated from the second side by a second distance in the first axial direction; or, the fourth edge is in contact with the first side and the third edge is separated from the second side by a second distance in the first axial direction; and,
a first line, in the first circumferential direction passes through, in sequence, the first slot, material forming the cushion segment, and the second slot.

3. The clutch plate of claim 2, wherein:
a second line, in a radial direction orthogonal to the axis of rotation, passes through the first slot and the radially outermost edge; and,
a third line, in the radial direction, passes through the second slot and the outer edge.

4. The clutch plate of claim 1, further comprising:
a plurality of cushion segments, including the first cushion segment, axially located within the gap.

5. The clutch plate of claim 1, further comprising:
first and second fasteners fixedly connecting the first cushion segment to the first and second annular backing plates, respectively, wherein a first line, orthogonal to the axis of rotation, passes through, in sequence, the first fastener, the first slot, and the radially outermost edge.

6. A clutch plate, comprising:
an axis of rotation;
a first annular backing plate with a first side facing in a first axial direction;
a second annular backing plate:
   separated from the first annular backing plate by a gap in a first axial direction; and, including a second side facing the first side in a second axial direction, opposite the first axial direction;
a first cushion segment:
fixedly connected to the first annular backing plate; and,
including a first opening, an entirety of which is surrounded by a first material forming the first cushion segment, wherein:
the first opening includes a first continuous edge formed by the first material;
the first continuous edge includes first and second segments;
the first segment is in contact with the first side; and,
the second segment is separated from the first side by a first distance in the first axial direction.

7. The clutch plate of claim 6, wherein:
the first cushion segment includes a second opening, an entirety of which is surrounded by the first material forming the first cushion segment;
the second opening includes a second continuous edge formed by the first material;
the second continuous edge includes third and fourth segments;
the third segment is in contact with the first side;
the fourth segment is separated from the first side by a second distance in the first axial direction; and,
a first line in a first circumferential direction passes through the first and second openings.

8. The clutch plate of claim 6, wherein:
the first cushion segment includes:
a first slot:
extending into the first cushion segment in a first circumferential direction; and,
including a first edge;
a second slot:
extending into the first cushion segment in the first circumferential direction; and,
including a second edge; and,
a first protrusion radially disposed between the first and second slots;
the first edge is in contact with the first side; and,
the second edge is separated from the first side by a first distance in the first axial direction.

9. The clutch plate of claim 8, wherein a first straight line passes through the first segment, the second segment, the first edge, and the second edge.

10. The clutch plate of claim 8, further comprising:
a fastener passing through the first protrusion and fixedly connecting the first cushion segment to the first annular backing plate.

11. The clutch plate of claim 8, wherein:
the first cushion segment includes:
a third slot extending into the first cushion segment in a second circumferential direction, opposite the first circumferential direction, and including a third edge;
a fourth slot extending into the first cushion segment in the second circumferential direction and including a fourth edge; and,
a second protrusion radially disposed between the third and fourth slots;
the third edge is in contact with the first side; and,
the fourth edge is separated from the first side by a second distance in the first axial direction.

12. The clutch plate of claim 8, wherein:
the first cushion segment includes:
a third slot extending into the first cushion segment in the first circumferential direction;
a fourth slot extending into the first cushion segment in the first circumferential direction; and,
a second protrusion radially disposed between the third and fourth slots; and,
a straight line passes through the first opening, the first protrusion and the second protrusion.

13. The clutch plate of claim 6, wherein the first cushion segment includes a protrusion formed by the first opening, the clutch plate further comprising:
a fastener passing through the protrusion and fixedly connecting the first cushion segment to the first annular backing plate.

14. The clutch plate of claim 6, wherein:
the first continuous edge includes third and fourth segments;
the third segment is in contact with the first side; and,
the fourth segment is separated from the first side by a second distance in the first axial direction.

15. A clutch plate, comprising:
an axis of rotation;
a first annular backing plate with a first side facing in a first axial direction;
a second annular backing plate:
separated from the first annular backing plate by a gap in a first axial direction; and,
including a second side facing the first side in a second axial direction, opposite the first axial direction;
a first cushion segment fixedly connected to the first annular backing plate, the first cushion segment including a first radially outermost edge with first and second portions and a first opening, an entirety of which is surrounded by a first material forming the first cushion segment, a first continuous edge formed by the first material, the first opening including a first continuous edge formed by the first material; and,
a second cushion segment fixedly connected to the second annular backing plate, the second cushion segment including a second radially outermost edge and a second opening, an entirety of which is surrounded by a second material forming the second cushion segment, the second opening including a second continuous edge formed by the second material, the second cushion having:
a third portion in contact with the first portion; and,
a fourth portion:
aligned with the second portion in a first axial direction; and,
separated from the second portion by a first distance in the first axial direction.

16. The clutch plate of claim 15, wherein:
the first continuous edge includes:
a first segment in contact with the first side; and,
a second segment separated from the first side by a first distance in the first axial direction; and,
the second continuous edge includes:
a third segment in contact with the second side; and,
a fourth segment separated from the second side by a second distance in the second axial direction.

17. The clutch plate of claim 16, wherein:
the first cushion segment includes a third opening, an entirety of which is surrounded by the first material forming the first cushion segment;
the third opening includes a third continuous edge formed by the first material;

the third continuous edge includes:
  a fifth segment in contact with the first side; and,
  a sixth segment separated from the first side by the first distance in the first axial direction;
the second cushion segment includes a fourth opening, an entirety of which is surrounded by the second material forming the second cushion segment;
the fourth opening includes a fourth continuous edge formed by the second material; and,
the fourth continuous edge includes:
  a seventh segment in contact with the second side; and,
  an eighth segment separated from the second side by the second distance in the second axial direction.

18. The clutch plate of claim 16, wherein a line in a circumferential direction passes through the first and third openings.

19. The clutch plate of claim 15, wherein:
the first cushion segment includes first and second slots extending at least partially radially inward from the first radially outermost edge; and,
the first portion of the first radially outermost edge is sandwiched between the first and second slots.

20. The clutch plate of claim 15, wherein:
the second cushion segment includes first and second slots extending at least partially radially inward from the second radially outermost edge; and,
the third portion of the second radially outermost edge is sandwiched between the first and second slots.

\* \* \* \* \*